US008429467B2

(12) United States Patent
Fallen et al.

(10) Patent No.: US 8,429,467 B2
(45) Date of Patent: Apr. 23, 2013

(54) USER-TRIGGERED DIAGNOSTIC DATA GATHERING

(75) Inventors: Marcus Fallen, Belmont, CA (US); Benoit Dageville, Foster City, CA (US); Jonathan Klein, Redwood City, CA (US); Ajith Kumar Mysorenagarajarao, San Mateo, CA (US); Gary Ngai, Saratoga, CA (US); Mark Ramacher, San Carlos, CA (US); Yair Sarig, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 330 days.

(21) Appl. No.: 12/251,743

(22) Filed: Oct. 15, 2008

(65) Prior Publication Data

US 2009/0106596 A1    Apr. 23, 2009

Related U.S. Application Data

(60) Provisional application No. 60/981,456, filed on Oct. 19, 2007.

(51) Int. Cl.
*G06F 11/00* (2006.01)

(52) U.S. Cl.
USPC .............................................. 714/57; 714/37

(58) Field of Classification Search ...................... 714/57
See application file for complete search history.

(56) References Cited

U.S. PATENT DOCUMENTS

| | | | |
|---|---|---|---|
| 4,866,635 A | 9/1989 | Kahn et al. | |
| 5,067,099 A | 11/1991 | McCown et al. | |
| 5,123,017 A | 6/1992 | Simpkins et al. | |
| 5,309,448 A | 5/1994 | Bouloutas et al. | |
| 5,845,272 A | 12/1998 | Morjaria et al. | |
| 5,920,489 A | 7/1999 | Dibrino et al. | |
| 5,922,079 A | 7/1999 | Booth et al. | |
| 5,968,122 A | 10/1999 | Schlosser et al. | |

(Continued)

FOREIGN PATENT DOCUMENTS

EP         633536 A1     11/1995

OTHER PUBLICATIONS

Alexandru, M., et al., "An architectural system solution for technical diagnosis," pp. TuD5-17-TuD5-22, International Society of Information Fusion (ISIF), Copyright 2000. [Can also be found in Information Fusion 2000, Jul. 10-13, 2000, vol. 1.].

U.S. Appl. No. 12/485,759, filed Jun. 16, 2009, Beg et al.

(Continued)

*Primary Examiner* — Michael Maskulinski

(74) *Attorney, Agent, or Firm* — Kilpatrick Townsend & Stockton LLP

(57) ABSTRACT

An infrastructure is provided for gathering diagnostic data that is relevant to an error or other conditions detected in a monitored system. A diagnosability framework is provided that automates the gathering of relevant diagnostic data upon occurrence of the condition in the monitored system. In one embodiment, context data is determined for the condition detected in the monitored system. A rule-based engine is provided that is configured to automatically determine one or more actions to be performed for the condition detected in the monitored system based on the determined context data. The actions may include performing tasks that gather diagnostic data that is relevant to the detected condition, store the gathered diagnostic data in a repository, recommend one or more diagnostic actions to a user, and other diagnostic related actions.

22 Claims, 6 Drawing Sheets

U.S. PATENT DOCUMENTS

| | | | |
|---|---|---|---|
| 6,012,152 | A | 1/2000 | Douik et al. |
| 6,076,083 | A | 6/2000 | Baker |
| 6,125,311 | A | 9/2000 | Lo |
| 6,182,249 | B1 | 1/2001 | Wookey et al. |
| 6,208,955 | B1 | 3/2001 | Provan et al. |
| 6,237,114 | B1 | 5/2001 | Wookey et al. |
| 6,243,628 | B1 | 6/2001 | Bliley et al. |
| 6,349,335 | B1 | 2/2002 | Jenney |
| 6,434,512 | B1 | 8/2002 | Discenzo |
| 6,519,552 | B1 | 2/2003 | Sampath et al. |
| 6,535,865 | B1 | 3/2003 | Skaaning et al. |
| 6,539,337 | B1 | 3/2003 | Provan et al. |
| 6,550,024 | B1 | 4/2003 | Pagurek et al. |
| 6,553,548 | B1 | 4/2003 | Hekmatpour |
| 6,574,717 | B1 | 6/2003 | Ngai et al. |
| 6,604,141 | B1 | 8/2003 | Ventura |
| 6,615,090 | B1* | 9/2003 | Blevins et al. ................... 700/26 |
| 6,633,782 | B1* | 10/2003 | Schleiss et al. ................. 700/26 |
| 6,665,425 | B1 | 12/2003 | Sampath et al. |
| 6,681,215 | B2 | 1/2004 | Jammu |
| 6,697,810 | B2 | 2/2004 | Kumar et al. |
| 6,697,962 | B1 | 2/2004 | McCrory et al. |
| 6,738,811 | B1 | 5/2004 | Liang |
| 6,782,345 | B1 | 8/2004 | Siegel et al. |
| 6,862,698 | B1 | 3/2005 | Shyu |
| 6,892,317 | B1 | 5/2005 | Sampath et al. |
| 6,910,000 | B1 | 6/2005 | Yedidia et al. |
| 6,915,128 | B1 | 7/2005 | Oh |
| 6,944,800 | B2 | 9/2005 | Brundridge et al. |
| 6,983,200 | B2 | 1/2006 | Bodin et al. |
| 6,985,901 | B1 | 1/2006 | Sachse et al. |
| 7,047,386 | B1 | 5/2006 | Ngai et al. |
| 7,062,749 | B2 | 6/2006 | Cyr et al. |
| 7,096,387 | B2 | 8/2006 | Durrant et al. |
| 7,113,988 | B2 | 9/2006 | Chirashnya et al. |
| 7,124,328 | B2 | 10/2006 | Bowers et al. |
| 7,165,190 | B1 | 1/2007 | Srivastava et al. |
| 7,177,769 | B2 | 2/2007 | Larsson et al. |
| 7,257,744 | B2 | 8/2007 | Sabet et al. |
| 7,281,040 | B1 | 10/2007 | Ly |
| 7,281,170 | B2 | 10/2007 | Taylor et al. |
| 7,308,385 | B2 | 12/2007 | Wegerich et al. |
| 7,313,735 | B1 | 12/2007 | Levergood et al. |
| 7,525,910 | B2 | 4/2009 | Wen |
| 7,533,305 | B2* | 5/2009 | Behdjati et al. ................. 714/57 |
| 7,546,222 | B2 | 6/2009 | Chintalapti et al. |
| 7,577,872 | B2* | 8/2009 | DiBartolomeo et al. ....... 714/27 |
| 7,603,674 | B2 | 10/2009 | Cyr et al. |
| 7,668,953 | B1 | 2/2010 | Sinclair et al. |
| 7,802,144 | B2 | 9/2010 | Vinberg et al. |
| 7,937,623 | B2 | 5/2011 | Ramacher et al. |
| 7,941,707 | B2 | 5/2011 | Sarig et al. |
| 7,954,090 | B1 | 5/2011 | Qureshi et al. |
| 8,032,625 | B2 | 10/2011 | Benfield et al. |
| 8,036,935 | B2* | 10/2011 | Burger et al. ............. 705/14.27 |
| 8,046,673 | B2 | 10/2011 | Polo-Malouvier et al. |
| 8,074,103 | B2 | 12/2011 | Dilman et al. |
| 2003/0033559 | A1 | 2/2003 | Williams |
| 2003/0074607 | A1 | 4/2003 | Brundridge et al. |
| 2003/0135592 | A1 | 7/2003 | Vetter et al. |
| 2003/0221123 | A1 | 11/2003 | Beavers |
| 2004/0078683 | A1* | 4/2004 | Buia et al. ....................... 714/37 |
| 2004/0078695 | A1 | 4/2004 | Bowers et al. |
| 2004/0078727 | A1 | 4/2004 | Little et al. |
| 2004/0153429 | A1 | 8/2004 | Horn et al. |
| 2004/0193956 | A1 | 9/2004 | Greenlee et al. |
| 2005/0102567 | A1* | 5/2005 | McGuire et al. ................ 714/25 |
| 2005/0120273 | A1 | 6/2005 | Hudson et al. |
| 2005/0160325 | A1 | 7/2005 | Ogino et al. |
| 2005/0210331 | A1 | 9/2005 | Connelly et al. |
| 2005/0228880 | A1 | 10/2005 | Champlin |
| 2006/0150156 | A1 | 7/2006 | Cyr et al. |
| 2006/0167947 | A1 | 7/2006 | Dunkle |
| 2006/0200711 | A1 | 9/2006 | Schondelmayer et al. |
| 2006/0256727 | A1 | 11/2006 | Acharya et al. |
| 2006/0285648 | A1 | 12/2006 | Wahl et al. |
| 2007/0021966 | A1 | 1/2007 | Ellefson et al. |
| 2007/0283329 | A1 | 12/2007 | Caprihan et al. |
| 2007/0294003 | A1 | 12/2007 | Underdal et al. |
| 2008/0065706 | A1 | 3/2008 | Miller et al. |
| 2008/0109796 | A1 | 5/2008 | Kosche |
| 2008/0125877 | A1 | 5/2008 | Miller et al. |
| 2008/0133978 | A1 | 6/2008 | Angamuthu et al. |
| 2008/0141072 | A1 | 6/2008 | Kalgren et al. |
| 2008/0189488 | A1 | 8/2008 | DeWitt et al. |
| 2008/0208784 | A1 | 8/2008 | Hill et al. |
| 2008/0208787 | A1 | 8/2008 | Luchene |
| 2008/0255885 | A1 | 10/2008 | Eisenberger et al. |
| 2008/0263399 | A1 | 10/2008 | Cousin et al. |
| 2008/0282095 | A1 | 11/2008 | Haider et al. |
| 2008/0297375 | A1 | 12/2008 | Khuzadi |
| 2009/0028055 | A1 | 1/2009 | Zaencker et al. |
| 2009/0083576 | A1 | 3/2009 | Vlassova et al. |
| 2009/0105982 | A1 | 4/2009 | Sarig et al. |
| 2009/0105989 | A1 | 4/2009 | Ramacher et al. |
| 2009/0105991 | A1 | 4/2009 | Ramacher et al. |
| 2009/0106180 | A1 | 4/2009 | Kuchibhotla et al. |
| 2009/0106262 | A1 | 4/2009 | Fallen et al. |
| 2009/0106278 | A1 | 4/2009 | Ramacher et al. |
| 2009/0106363 | A1 | 4/2009 | Fallen et al. |
| 2009/0106589 | A1 | 4/2009 | Ramacher et al. |
| 2009/0106595 | A1 | 4/2009 | Sarig et al. |
| 2009/0106601 | A1 | 4/2009 | Ngai et al. |
| 2009/0106605 | A1 | 4/2009 | Kuchibhotla et al. |
| 2009/0204234 | A1 | 8/2009 | Sustaeta et al. |
| 2009/0327815 | A1 | 12/2009 | Sridharan et al. |
| 2010/0100778 | A1 | 4/2010 | Sullivan |
| 2010/0257410 | A1 | 10/2010 | Cottrell et al. |
| 2010/0318847 | A1 | 12/2010 | Beg et al. |
| 2010/0318853 | A1 | 12/2010 | Beg et al. |
| 2010/0318855 | A1 | 12/2010 | Beg et al. |
| 2011/0116381 | A1 | 5/2011 | Nikander et al. |
| 2011/0153540 | A1 | 6/2011 | Beg et al. |

OTHER PUBLICATIONS

U.S. Appl. No. 12/485,763, filed Jun. 16, 2009, Beg et al.
U.S. Appl. No. 12/485,766, filed Jun. 16, 2009, Beg et al.
U.S. Appl. No. 12/641,038, filed Dec. 17, 2009, Beg et al.
Avin, C., et al., "Identifiability of Path-Specific Effects," UCLA Cognitive Systems Laboratory, Technical Report R-321 of Jun. 2005, in Proceedings of the 19th International Joint Conference on Artificial Intelligence, Edinburgh, Scotland, Aug. 2005, 7 pages.
Haicheng, W., et al., "Research on The Function Model of Distributed Intelligent Monitoring and Diagnosis System Based on Multi-Agent," in Electronic Measurement and Instruments, 2007, The Eighth International Conference on Electronic Measurement and Instruments, ICEMI 2007, pp. 3-393-3-396, Copyright 2007 IEEE.
Halpern, J. Y., et al., "Causes and Explanations: A Structural-Model Approach—Part I: Causes," Technical Report R-266-UAI of Jun. 2001, in Proceedings of the Seventeenth Conference on Uncertainty in Artificial Intelligence, San Francisco, CA, 2001, pp. 194-202. [Can also be found in British Journal of Philosophy of Science, vol. 56, 2005, pp. 843-887.].
Halpern, J. Y., et al., "Causes and Explanations: A Structural-Model Approach—Part II: Explanations," Technical Report R-266-IJCAI of Jun. 2001, in Proceedings of the Seventeenth International Joint Conference on Artificial Intelligence (IJCAI), San Francisco, CA, 2001, 8 pages. [Can also be found in British Journal of Philosophy of Science, vol. 56, 2005, pp. 889-911.].
Jongsawat, N., et al., "Dynamic Data Feed to Bayesian Network Model and Smile Web Application," in Ninth ACIS International Conference on Software Engineering, Artificial Intelligence, Networking, and Parallel/Distributed Computing, pp. 931-936, Copyright 2008 IEEE.
Morjaria, M., et al., "Monitoring Complex Systems with Causal Networks," IEEE Computational Science & Engineering, vol. 3, Issue 4, Winter 1996, pp. 9-10.
Nielsen, U. H., et al., "Explanation Trees for Causal Bayesian Networks," 8 pages. [Can also be found in Proceedings of the 24th Annual Conference on Uncertainty in Artificial Intelligence (UAI-08), 2008, pp. 427-434.].
Pearl, J., "Causal Diagrams for Empirical Research (With Discussions)," Technical Report R-218-B, Biometrika, vol. 82, No. 4, 1995, pp. 669-710, printed in Great Britain.

Pearl, J., "Causal Inference in Statistics: An Overview," Technical Report R-350 of Sep. 2009, Statistics Surveys, vol. 3, 2009, pp. 96-146.
Pearl, J., "Direct and Indirect Effects," Technical Report R-273-UAI of Jun. 2001, In Proceedings of the Seventeenth Conference on Uncertainty in Artificial Intelligence, San Francisco, CA, 2001, pp. 411-420.
Pearl, J., "Robustness of Causal Claims," Technical Report R-320 of Mar. 2004, Submitted to the 20$^{th}$ Conference on Uncertainty in Artificial Intelligence, Banff, Canada, Jul. 2004, 8 pages. [Can also be found in Proceedings of the 20$^{th}$ Conference on Uncertainty in Artificial Intelligence, AUAI Press, Arlington, VA, Jul. 2004, pp. 446-453.].
Pearl, J., "Simpson's Paradox: An Anatomy," Technical Report R-264, Extracted from Chapter 6 of Causality, Apr. 1999, pp. 1-11.
Pearl, J., "Statistics and Causal Inference: A Review," Test Journal, vol. 12, No. 2, Dec. 2003, pp. 281-345.
Pearl, J., "The Logic of Counterfactuals in Causal Inference (Discussion of 'Causal Inference without Counterfactuals' by A.P. Dawid)," Technical Report R-269 of Apr. 2000, in Journal of American Statistical Association, vol. 95, No. 450, Jun. 2000, pp. 428-435.
Tian, J., et al., "A General Identification Condition for Causal Effects," Technical Report R-290-A of Aug. 2002, in Proceedings of the Eighteenth National Conference on Artificial Intelligence, AAAI Press/The MIT Press: Menlo Park, CA, Aug. 2002, pp. 567-573.
Tian, J., et al., "Probabilities of Causation: Bounds and Identification," Technical Report R-271-A of Feb. 2000, in Annals of Mathematics and Artificial Intelligence, vol. 28, 2000, pp. 287-313.
Uraikul, V., "Artificial Intelligence for Monitoring and Supervisory Control of Process Systems," Science Direct, in Engineering Applications of Artificial Intelligence, vol. 20, Issue 2, Mar. 2007, 17 pages (pp. 115-131 in publication), Copyright 2006 Elsevier Ltd.
Yu, J., et al., "Intelligent Monitoring and Diagnosis of Manufacturing Processes Using an Integrated Approach of KBANN and GA,"Science Direct, in Computers in Industry, vol. 59, Issue 5, May 2008, 13 pages (pp. 489-501 in publication), Copyright 2007 Elsevier B.V.
Zhang, D., et al., "Researches and Application of a Hybrid Fault Diagnosis Expert System," Proceedings of the 3$^{rd}$ World Congress on Intelligent Control and Automation, Jun. 28-Jul. 2, 2000, Hefei, P.R. China, pp. 215-219, Copyright 2000 IEEE.
Non-Final Office Action for U.S. Appl. No. 12/251,671 mailed on Sep. 17, 2010; 13 pages.
Non-Final Office Action for U.S. Appl. No. 12/251,700 mailed on Jul. 19, 2010; 16 pages.
Non-Final Office Action for U.S. Appl. No. 12/252,056 mailed on Sep. 21, 2010; 17 pages.
Non-Final Office Action for U.S. Appl. No. 12/251,731 mailed on Mar. 2, 2011; 36 pages.
Non-Final Office Action for U.S. Appl. No. 12/251,677 mailed on Mar. 1, 2011; 24 pages.
Non-Final Office Action for U.S. Appl. No. 12/251,648 mailed on Mar. 1, 2011; 35 pages.
Office Communication for U.S. Appl. No. 12/251,671 mailed on Feb. 9, 2011; 4 pages.
Final Office Action for U.S. Appl. No. 12/251,661 mailed on Jun. 8, 2011; 20 pages.
Non-Final Office Action for U.S. Appl. No. 12/251,685 mailed on May 31, 2011; 10 pages.
Final Office Action for U.S. Appl. No. 12/251,711 mailed on May 19, 2011; 9 pages.
Non-Final Office Action for U.S. Appl. No. 12/485,766 mailed on Jan. 25, 2011; 21 pages.
Notice of Allowance for U.S. Appl. No. 12/252,056 mailed on Jan. 6, 2011; 6 pages.
Notice of Allowance for U.S. Appl. No. 12/251,671 mailed on Jan. 5, 2011; 6 pages.
Final Office Action for U.S. Appl. No. 12/251,700 mailed on Dec. 29, 2010; 14 pages.
Non-Final Office Action for U.S. Appl. No. 12/252,128 mailed on Dec. 23, 2010; 19 pages.
Non-Final Office Action for U.S. Appl. No. 12/485, 759 mailed on Dec. 21, 2010; 21 pages.
Non-Final Office Action for U.S. Appl. No. 12/251,661 mailed on Nov. 10, 2010; 18 pages.
Non-Final Office Action for U.S. Appl. No. 12/251,711 mailed on Nov. 9, 2010; 18 pages.
Notice of Allowance for U.S. Appl. No. 12/251,700 mailed on Sep. 30, 2011, 10 pages.
Final Office Action for U.S. Appl. No. 12/251,731 mailed on Sep. 23, 2011, 23 pages.
Notice of Allowance for U.S. Appl. No. 12/251,667 mailed on Sep. 20, 2011, 9 pages.
Non-Final Office Action for U.S. Appl. No. 12/251,648 mailed on Sep. 20, 2011, 25 pages.
Non-Final Office Action for U.S. Appl. No. 12/252,070 mailed on Aug. 25, 2011, 7 pages.
Final Office Action for U.S. Appl. No. 12/252,128 mailed on Aug. 12, 2011, 10 pages.
Notice of Allowance for U.S. Appl. No. 12/251,711 mailed on Aug. 11, 2011, 1 page.
Notice of Allowance for U.S. Appl. No. 12/485,766 mailed on Aug. 10, 2011, 1 page.
Final Office Action for U.S. Appl. No. 12/485,759 mailed on Aug. 8, 2011, 12 pages.
Office Action for U.S. Appl. No. 12/251,685 mailed Aug. 31, 2012.
Office Action for U.S. Appl. No. 12/485,763 mailed Aug. 29, 2012.
Office Action for U.S. Appl. No. 12/251,667 (Jan. 17, 2012).
Office Action for U.S. Appl. No. 12/251,685 (Jan. 9, 2012).
Notice of Allowance for U.S. Appl. No. 12/251,648 (Feb. 29, 2012).
Office Action for U.S. Appl. No. 12/485,763 (Feb. 3, 2012).
Notice of Allowance for U.S. Appl. No. 12/252,128 (Dec. 12, 2011).
Notice of Allowance for U.S. Appl. No. 12/485,759 (Dec. 19, 2011).
Notice of Allowance for U.S. Appl. No. 12/252,070 (Feb. 8, 2012).
Notice of Allowance for U.S. Appl. No. 12/251,731 (Apr. 2, 2012).
Notice of Allowance for U.S. Appl. No. 12/251,700 (Dec. 29, 2011).
Notice of Allowance for U.S. Appl. No. 12/485,766 (Nov. 9, 2011).
Final Office Action for U.S. Appl. No. 12/251,685 mailed Dec. 18, 2012.
Notice of Allowance for U.S. Appl. No. 12/485,763 mailed Dec. 12, 2012.
Non-Final Office Action for U.S. Appl. No. 12/641,038 mailed Jan. 16, 2013.

* cited by examiner

USER-TRIGGERED DIAGNOSTIC DATA GATHERING

CROSS-REFERENCES TO RELATED APPLICATIONS

This application claims the benefit and priority under 35 U.S.C. 119(e) of U.S. Provisional Application Ser. No. 60/981,456, filed 19 Oct. 2007, entitled DIAGNOSABILITY FRAMEWORK, the contents of which are herein incorporated by reference in their entirety for all purposes.

This application also incorporates by reference for all purposes the entire contents of the following related and commonly-assigned non-provisional applications, all filed concurrently with the present application:
(1) U.S. application Ser. No. 12/252,056 entitled DIAGNOSABILITY SYSTEM;
(2) U.S. application Ser. No. 12/251,711 entitled NON-INTRUSIVE GATHERING OF DIAGNOSTIC DATA USING ASYNCHRONOUS MECHANISMS.
(3) U.S. application Ser. No. 12/251,731 entitled GATHERING CONTEXT INFORMATION USED FOR ACTIVATION OF CONTEXTUAL DUMPING;
(4) U.S. application Ser. No. 12/251,648 entitled RULE-BASED ENGINE FOR GATHERING DIAGNOSTIC DATA;
(5) U.S. application Ser. No. 12/251,661 entitled DIAGNOSTIC DATA REPOSITORY;
(6) U.S. application Ser. No. 12/251,667 entitled DIAGNOSABILITY SYSTEM: FLOOD CONTROL;
(7) U.S. application Ser. No. 12/251,671 entitled GATHERING INFORMATION FOR USE IN DIAGNOSTIC DATA DUMPING UPON FAILURE OCCURRENCE;
(8) U.S. application Ser. No. 12/251,685 entitled SCRUBBING AND EDITING OF DIAGNOSTIC DATA;
(9) U.S. application Ser. No. 12/251,700 entitled INTELLIGENT COLLECTION OF DIAGNOSTIC DATA FOR COMMUNICATION TO DIAGNOSIS SITE SCRUBBING AND EDITING OF DIAGNOSTIC DATA;
(10) U.S. application Ser. No. 12/252,070 entitled HEALTH METER;
(11) U.S. application Ser. No. 12/252,128 entitled HEALTH MONITOR.

BACKGROUND OF THE INVENTION

The present invention relates to system maintenance and diagnosis, and more particularly to techniques for gathering diagnostic data that is relevant to a condition detected in a monitored system.

When a system encounters a failure or error, diagnostic data is typically collected and stored to a disk for diagnostic analysis. The diagnostic data may be communicated to a diagnosis site for analysis and resolution of the error. The amount of diagnostic data that is captured varies from one system to another. Using one conventional approach, all of the data associated with the system is gathered and stored to the persistent memory (e.g., a disk) for diagnostic purposes. The stored data is then communicated to a diagnosis site for analysis. Such an approach of complete diagnostic data gathering however consumes a lot of time and valuable system resources. Further, the amount of data that is collected may include thousands of files and many gigabytes of data. Sending such a large volume of data to the diagnosis site is cumbersome, time-consuming, and expensive. Further, if the data received at a diagnosis site is very large, it takes the vendor a long time to analyze the received diagnostic data to identify relevant pieces of data for analyzing a particular problem.

Alternatively, only a basic set of diagnostic data associated with the system is collected and stored during an initial diagnostic process. The diagnostic data gathered by the initial diagnostic process is then analyzed to determine what additional diagnostic processes have to be run to capture additional data that is more relevant to the specific failure and essential for error resolution. This iterative process continues until someone manually determines that sufficient data has been gathered to solve the problem. The second approach thus requires diagnostic data gathering to be performed over multiple stages. At the end of each stage, a manual determination has to be made if sufficient diagnostic data has been gathered. This process is very time-consuming and also error-prone due to its manual component. Thus, using either approach, the time needed to resolve the error is increased, leading to customer dissatisfaction.

As indicated above, several prior solutions for gathering diagnostic data rely on a human to gather the relevant diagnostic data for a failure, analyze the gathered diagnostic data, and determine if any additional data needs to be collected. For example, a system administrator of a software system may track the failures in the system and determine the diagnostic data to be gathered and sent to the software vendor for diagnostic analysis. Typically, the administrator has to manually decide and generate the diagnostic data that is needed for proper diagnosis of the failure. Gathering a sufficient amount of diagnostic data that is relevant for resolving a particular error usually takes several iterations including many round trips between the administrator and the software support/development organization. This results in a long resolution time for the failure or error. Further, because of the manual component and because system administrators can have different skill levels, the reliability of the data gathering process is not assured and not repeatable.

Certain diagnostic data gatherings may not be performed automatically but rather require customer inputs such as customer approval. In today's systems, there is no automated mechanism for managing such diagnostic data gatherings that require customer intervention or customer approval. Often, recommendations to take certain actions for diagnostic data gathering are instead communicated through the vendor's support organization, or through documentation.

BRIEF SUMMARY OF THE INVENTION

Embodiments of the present invention provide an infrastructure for gathering diagnostic data that is relevant to a condition detected in a monitored system. A diagnosability framework is provided that automates the gathering of relevant diagnostic data upon occurrence of the condition in the monitored system. In one embodiment, context data is determined for the condition detected in the monitored system. A rule-based engine is provided that is configured to automatically determine one or more actions to be performed for the condition detected in the monitored system based on the determined context data. The actions may include performing tasks that gather diagnostic data that is relevant to the detected condition, store the gathered diagnostic data in a repository, recommend one or more diagnostic actions to a user, and other diagnostic related actions.

The diagnosability framework according to an embodiment of the present invention may be used with various different systems including but not restricted to software systems including complex enterprise software systems, hardware systems, and others.

According to an embodiment of the present invention, techniques are provided for determining a diagnostic action to be performed in a monitored system. A condition may be detected in the monitored system. Context data may be determined for the detected condition. A diagnostic action to be performed responsive to the detected condition may be determined based upon the context data determined for the detected condition. Information recommending execution of the diagnostic action may be output. The diagnostic action may be executed only upon receiving an input from a user to execute the diagnostic action, wherein the diagnostic action is executed using the context data determined for the detected condition.

In one embodiment, the condition detected in the monitored system may identify an error in the monitored system. Context data is determined for the error condition detected in the monitored system.

In one embodiment, the context data comprises information related to the detected condition in the monitored system, information related to functions and/or processes that are being executed in the monitored system, or combinations thereof.

In one embodiment, determining the diagnostic action to be performed comprises determining a set of one or more rules configured for the monitored system and determining that the condition associated with a first rule from the set of rules is satisfied by the context data determined, wherein at least one action specified by the first rule is the diagnostic action determined to be performed in the monitored system. Each rule configured for the monitored system may specify a condition and one or more actions to be performed when the condition specified in the rule is satisfied.

In one embodiment, the diagnostic action may include an action to generate a test case to determine information related to the monitored system. The diagnostic action may also include an action to gather diagnostic data that is relevant to the detected condition.

In one embodiment, diagnostic data that is relevant to the detected condition may be gathered prior to communicating the relevant diagnostic data to a diagnosis system.

In one embodiment, the diagnostic action may be executed at a later point of time after occurrence of the condition in the monitored system.

The foregoing, together with other features and embodiments will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide an infrastructure for gathering diagnostic data that is relevant to a condition detected in a monitored system. A diagnosability framework is provided that automates the gathering of relevant diagnostic data upon occurrence of the condition in the monitored system. In one embodiment, context data is determined for the condition detected in the monitored system and is used to automate the diagnostic data gathering that is relevant to the detected condition in the monitored system. The context data may include information related to the detected condition in the monitored system, information related to functions and components in the monitored system, and other information.

In one embodiment, a rule-based engine is provided that is configured to automatically determine one or more diagnostic actions to be performed based on the context data determined for the condition detected in a monitored system. In this manner, the human component of manually iteratively determining the relevant diagnostic data to be gathered is eliminated. This in turn reduces the time-to-resolution for an error or other conditions detected in the monitored system.

Some diagnostic actions determined by the rule-based engine may be automatically performed without any user intervention, while other diagnostic actions (also sometimes referred to as user actions) may be recommended to be performed and may require user inputs such as user approval and/or user input arguments before actually being performed. In one embodiment, a user action is executed at some point much later than when the condition that triggered the recommendation of the action occurred. In this manner, by allowing the user to control the execution of a diagnostic action, the possible system performance impact of automatically performing heavy data gathering at the time of an error or other system condition is avoided.

Figure 1:
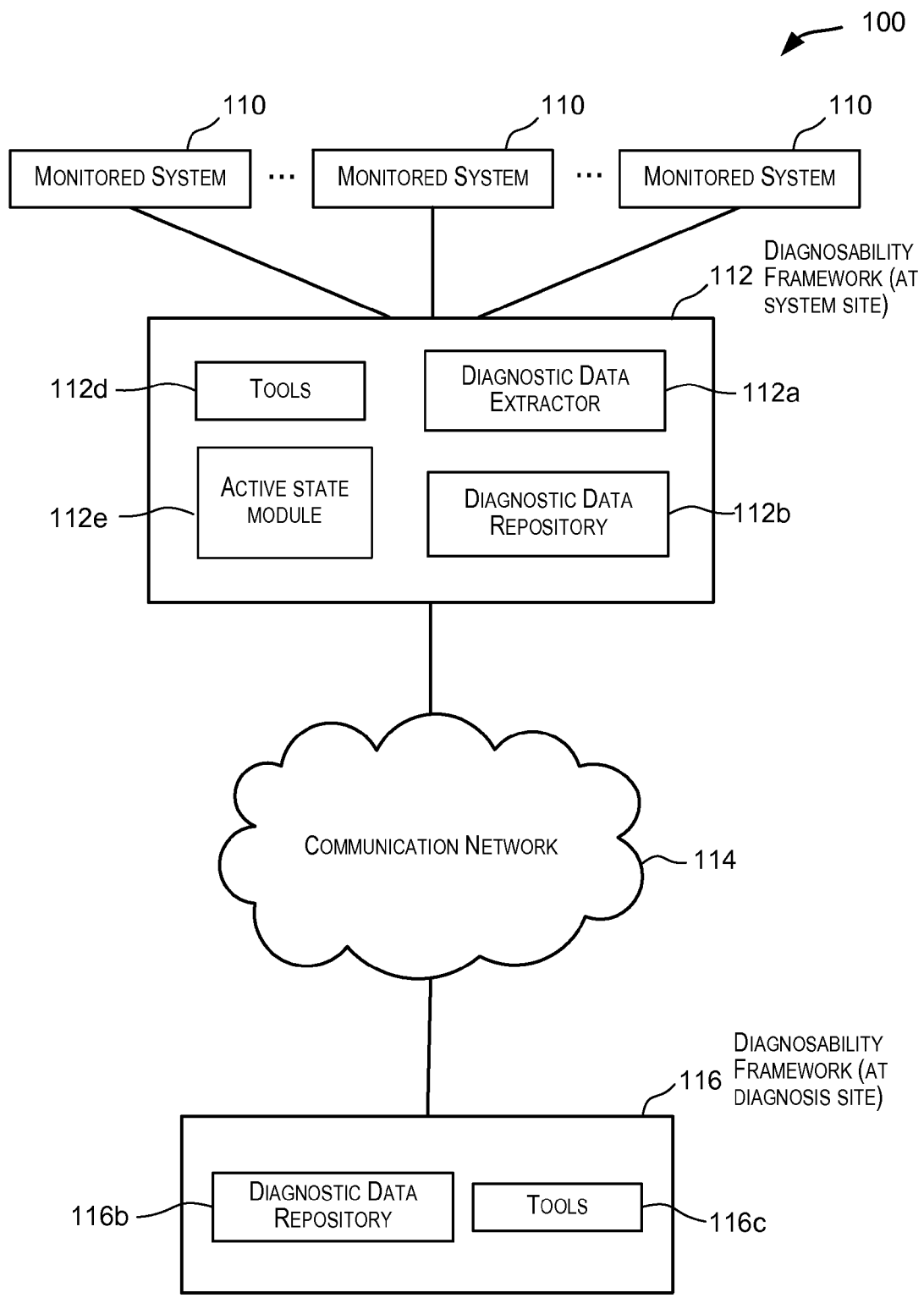
FIG. 1 is a simplified block diagram illustrating a diagnosability system according to an embodiment of the invention.

FIG. 1 is a simplified block diagram of a diagnosability system 100 according to an embodiment of the present invention. Diagnosability system 100 facilitates collection, storage, communication, and analysis of diagnostic data for one or more monitored systems 110 (which may be different products or different instances of the same product). Monitored system 110 may be a software system, a hardware system, an enterprise system, and like. For example, monitored system 110 may be a complex enterprise software system such as a database system and related products provided by Oracle Corporation™ of California.

As depicted in FIG. 1, diagnosability system 100 comprises a diagnosability framework 112 deployed at a system site to provide diagnostic support for monitored system 110. Diagnosability system 100 also comprises a diagnosability framework 116 deployed at a diagnosis site. A diagnosis site may be for example a site of a vendor that is responsible for diagnosing problems that may occur in monitored system 110.

In a typical diagnostic workflow, diagnostic data is captured and stored for monitored system 110 by diagnosability framework 112. For example, diagnosability framework 112 may be configured to gather and store diagnostic data related to monitored system 110 when an error or other condition is detected in monitored system 110. The diagnostic data collected and stored by diagnosability framework 112 may include, for example, trace data, diagnostic dumps, run reports, logs (e.g., error logs), results of diagnosability related actions, and the like. Portions of the diagnostic data stored by diagnosability framework 112 may be communicated to diagnosability framework 116 located at the diagnosis site for analysis, such as failure analysis. The diagnostic data may be communicated from diagnosability framework 112 to diagnosability framework 116 via a communication network 114. Communication network 114 may be any network capable of communicating data such as the Internet, an intranet, a switched network, and the like. Communication network 114 may include wired or wireless communication links. Various communication protocols may be used to communicate data from diagnosability framework 112 to diagnosability framework 116.

As depicted in FIG. 1, diagnosability framework 112 comprises a diagnostic data extractor (DDE) 12a, a diagnostic data repository (DDR) 112b, an active state module 112e, and various tools 112d. The various components depicted in diagnosability framework 112 are merely examples of components that may be included in diagnosability framework 112. In alternate embodiments, diagnosability framework 112 may have less or more components than those shown. The components in diagnosability framework 112 may be implemented in software (e.g., code, program, instructions that are stored on a machine-readable medium and executed by a processor), hardware, or combinations thereof.

In one embodiment, active state module 112e is configured to gather and store information related to monitored system 110 during run time of the monitored system. Upon occurrence or detection of a condition in monitored system 110, a portion of the information that is gathered and stored by active state module 112e during run time is then available and provided as useful contextual data for facilitating the gathering of diagnostic data that is relevant to the detected condition. For example, the information that is gathered and stored by active state module 112e may be provided to DDE 112a for determining one or more diagnostic actions to be performed upon occurrence or detection of the condition in system 110 (e.g., actions for gathering diagnostic data relevant to the condition detected in system). In one embodiment, the information gathered and stored by active state module 112e during run time may be dumped to persistent memory (e.g., disk) upon occurrence or detection of a condition in system 110.

Various different types of information related to monitored system 110 may be gathered and stored by active state module 112e during run time of monitored system 110. In one embodiment, active state module 112e may gather and store information related to one or more local variables that are used in one or more functions in the call stack (a call stack stores information about processes and functions that are currently being executed by monitored system 110). For example, active state module 112e may gather and store pointers to the local variables that are used in a function during run time of the monitored system. If the pointers to the local variables are still pointing to something valid (i.e., local variables are still active) upon occurrence or detection of a condition in system 110, then the information related to the local variables (pointers to the variables and other information related to the variables) may be dumped to persistent memory or output to other components of diagnosability framework 112 for use in diagnostic data dumping.

In one embodiment, active state module 112e may gather and store information related to information that is explicitly tagged as relevant to diagnosis. The tagged information may be a specific section of system code or a specific function or process executing in the monitored system. The information related to the tagged information may include a name for the tag, a tag identifier of the tag, a tag state (e.g., "active" or "inactive"), and other information related to the tagged information. In one embodiment, a user such as a developer may explicitly tag a specific section of a function or a specific operation in monitored system 110 as relevant for diagnostics during design time. During run time of system 110, the tag state for a tag may be changed from "inactive" to "active" depending on whether the tagged information is active on the call stack or not. For example, if a specific function is tagged, and if the tagged function is currently active on the call stack, then the tag state associated with the tag is set to "active" and the tag is deemed to be an active tag. On the other hand, if the specific function is not active on the call stack, then the tag state associated with the tag is "inactive" and the tag is deemed to be an inactive tag.

In one embodiment, information related to the tagged information that is tagged by an active tag is provided as useful contextual data for diagnostic data dumping in monitored system 110 upon occurrence or detection of a condition in system 110. In this manner, tagging provides a window into what was occurring in the monitored system at and around the time of the error. Tagging also enables a user to specify what specific contextual data may be gathered by active state module 112e and used for diagnostic data dumping upon occurrence or detection of a condition in system 110.

DDE 112a is configured to detect occurrences of conditions in system 110 and determine one or more diagnostic actions to be performed in response to the detected conditions. In one embodiment, in response to a condition detected in monitored system 110, DDE 112a is configured to determine one or more diagnostic actions to be performed based upon context data determined for the detected condition. The context data determined for the condition may comprise various pieces of data such as:

Information related to the condition detected in monitored system 110, such as error number and error argument, and the like;

Information related to functions and components of system 110 on the call stack (i.e., a data structure that stores information about processes and/or functions that are currently being executed by monitored system 110) when the condition is detected in system 110;

Information related to one or more functions and components that signaled the detected condition;

Information related to the probable impacts that the detected conditions may have on monitored system 110;

Information that is gathered and provided by active state module 112e, such as the tagged information, and the like.

In one embodiment, DDE 112a is a rule-based engine that is configured with one or more DDE rules. A DDE rule may identify a DDE condition and one or more diagnostic actions (also referred to as DDE actions) to be performed when the DDE condition specified in the DDE rule is met. A DDE condition specified in a DDE rule may comprise information related to one or more conditions detected in monitored system 110, information related to functions and components that are currently being executed by monitored system 110 when the condition are detected in system 110, information related to tagged functions or processes, and other information. The diagnostic actions specified in a DDE rule may include determining and gathering diagnostic data that is deemed to be relevant to the detected condition in monitored system 110, recommending one or more actions to be performed (possibly for additional diagnostic data gathering or for remedying the impact of the error), invoking health checks (for gathering monitored system-related information for determining the health of the monitored system), and the like. DDE rules may be user-configurable.

In one embodiment, only diagnostic data that is deemed to be relevant to a condition detected in system 110 is gathered. The context data determined for the condition detected in monitored system 110 coupled with the use of the DDE 112*a* rules-based engine enables diagnosability framework 112 to intelligently gather diagnostic data that is relevant and useful for resolution of the condition that triggered the diagnostic data gathering. The DDE rules may be configured such that the right level of detail is collected and stored for the condition. Once the DDE rules have been evaluated, the diagnostic data to be gathered for a condition detected in monitored system 110 is automatically determined without requiring any human intervention. DDE 112*a* and its functions are discussed below in further details.

Diagnostic data repository (DDR) 112*b* (also sometimes referred to as ADR in the applications incorporated by reference in the present application) provides a centralized repository for storing diagnostic data related to monitored system 110 collected by diagnosability framework 112. The diagnostic data collected by diagnosability framework 112 may be stored in a structured format that enables searching and database-like querying capabilities. In one embodiment, DDR 112*b* is a file-based repository. Various different types of diagnostic data may be stored in DDR 112*b* such as traces, dumps, alert logs, health monitor reports, and the like. Information gathered by active state module 112*e* (e.g., such as information related to one or more local variables for a particular function on the call stack) may be stored or dumped into DDR 112*b*.

In one embodiment, DDR 112*b* is capable of storing diagnostic data for multiple monitored systems such as multiple monitored systems 110. The diagnostic data collected for each monitored system 110 may be stored under a separate directory (e.g., an ADR_HOME directory) allocated to that system. The ADR_HOME directories share a common structure to facilitate analysis of the stored data across multiple monitored systems 110. Multiple ADR_HOME directories may be present under a single ADR_BASE directory. In this manner, diagnostic data for multiple monitored systems 110 may be stored and organized in a consistent manner.

In one embodiment, the diagnostic data stored in DDR 112*b* may be tagged or annotated with metadata information. The metadata information may be used to find correlations between pieces of the diagnostic data stored in DDR 112*b*. The metadata also enables navigation of the diagnostic data stored in DDR 112*b*. The metadata may include one or more correlation keys. Further information related to DDR 112*b* and correlation keys may be found in the applications incorporated by reference in the present application.

Various tools 112*d* may be provided as part of diagnosability framework 112. These tools may include tools for querying the diagnostic data or information stored in diagnostic data repository 112*b*, tools for generating reports, analysis tools, and other tools that may use information collected and stored by diagnosability framework 112. Further information regarding tools 112*d* can be found in the applications incorporated by reference in the present application.

As mentioned previously, the diagnostics data collected by diagnosability framework 112 may also be forwarded to diagnosability framework 116 located at a diagnosis site (for example, the site of a software system vendor) for analysis. As depicted in FIG. 1, diagnosability framework 116 may comprise a diagnostic data repository 116*b*, and one or more tools 116*c*. The various components depicted in the diagnosability framework 116 are merely examples of components that may be included in the diagnosability framework. In alternate embodiments, diagnosability framework 116 may have less or more components than those shown in FIG. 1. The components depicted in diagnosability framework 16 may be implemented in software, hardware, or combinations thereof.

In one embodiment, diagnostic data repository 116*b* provides a repository for storing diagnostic data received from one or more system sites. In one embodiment, the structure of diagnostic data repository 116*b* is the same as the structure of diagnostic data repository 112*b* at system sites. This facilitates efficient storage and analysis of the data. In such an embodiment, data received from system site packages is stored in the same directory location in diagnostic data repository 116*b* as the data that was stored in diagnostic data repository 112*b*.

Various tools 116*c* may be provided in diagnosability framework 116 to help analyze the diagnostic data received from diagnosability framework 112 and to guide management and resolution of problems and errors in monitored systems. These tools may include command line or GUI-based tools for use by personnel at the diagnosis site. For example, the tools may include a tool that may be used to analyze the diagnostic data received from the software system site and to identify causes for the errors, tools for automatically routing the diagnostic data to a correct entity (e.g., a particular group or department responsible for the software that experienced the error, one or more software developers responsible for solving the error, a system administrator, etc.) for diagnosis, and the like.

The present application focuses on DDE 112*a* of diagnosability framework 112. Information related to the various other components of diagnosability system 100 may be found in the applications incorporated by reference in the present application.

Figure 2:
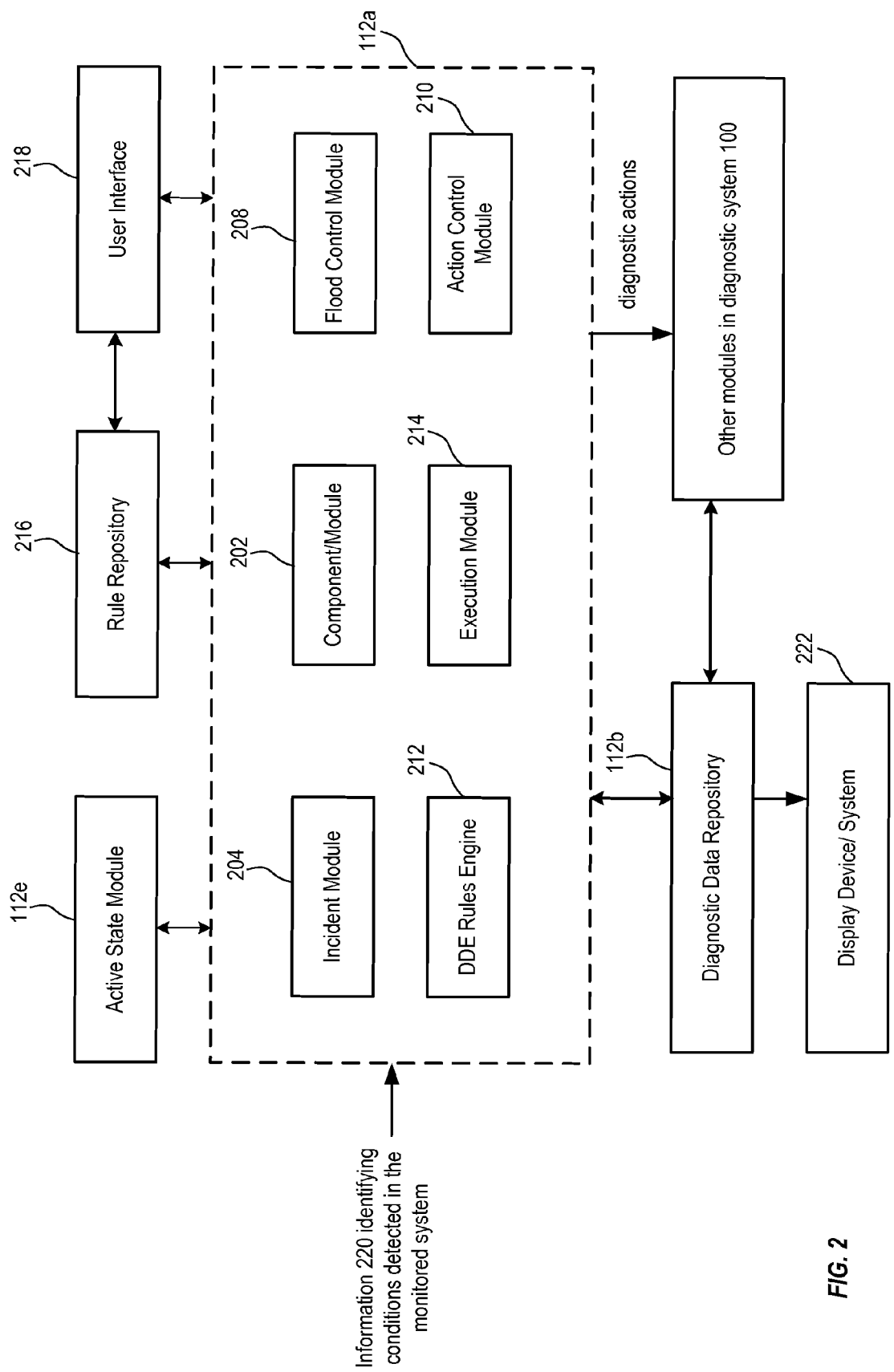
FIG. 2 is a simplified block diagram depicting a diagnostic data extractor (DDE) module according to an embodiment of the invention.

FIG. 2 is a simplified block diagram depicting a diagnostic data extractor (DDE) 112*a* according to an embodiment of the present invention. The various components depicted in FIG. 2 are merely examples of components that may be included in DDE 112*a*. In alternate embodiments, DDE module 112*a* may have less or more components than those shown in FIG. 2. The components depicted in FIG. 2 may be implemented in software (e.g., code, program, instructions that are stored in a machine-readable medium and executed by a processor), hardware, or combinations thereof.

As mentioned previously, DDE 112*a* is configured as a rule-based engine to automatically determine all of the relevant diagnostic data to be gathered for a condition detected in the monitored system based on context data that is determined for the condition. In one embodiment, a set of one or more DDE rules may be specified for DDE 112*a* with each rule identifying a DDE condition and one or more diagnostic actions to be performed when the DDE condition is met. The DDE condition specified in a DDE rule may include information related to the condition detected in monitored system 110, information related to function and processes that are executed by monitored system 110, information related to system components on the call stack at the time of the detection of the system condition, and other information. The diagnostic actions determined by DDE 112*a* may include collecting and storing diagnostic data that is relevant to the condition detected in the monitored system, recommending one or more actions to be executed, invoking one or more health checks, and other diagnostic related actions.

As depicted in FIG. 2, DDE 112*a* receives information 220 identifying one or more conditions detected in a monitored system, such as system 110 of FIG. 1. The one or more conditions may include one or more errors detected in monitored system 110. In one embodiment, errors may be classified as critical errors. An error may be considered a critical error if the error is caused due to the working of monitored system 110 itself as opposed to an error caused by a client or user's improper use of system 110. For example, a critical error may be an internal error, a system access violation, or some external error (e.g., an object being accessed no longer exists). Another type of error condition detected in system 110 may be classified as a soft assert. An error may be considered a soft assert if the error does not cause immediate harm to the monitored system. For example, leaving a file open rather than closing it when the process ends can be viewed as a soft assert—its an error, but not harmful typically.

As mentioned previously, various context data may be determined for a condition detected in monitored system 110. In one embodiment, the context data determined for a condition detected in monitored system 110 may be stored in diagnostic data repository 112b. The context data determined for a condition detected in monitored system 110 may include an error number and one or more error arguments associated with the condition detected in system 110. An error number and error arguments may identify the condition detected in system 110. For example, in an Oracle database system, error number ORA-60x identifies internal errors that occur in the monitored database system, and error number ORA-4020 identifies an external error that occurs in the database system such as a deadlock detected while trying to lock a library object.

A single error number may be associated with multiple errors or system conditions. Errors or other system conditions that are associated with the same error number may belong to the same class of errors or conditions. Since many errors or system conditions may be classified under the same error number, one or more error arguments may be used to further identify the errors or system conditions. For example, an error argument associated with an error or other system condition identified by an error number may indicate a specific code location that threw an exception that caused the error or other system condition. In this manner, error arguments provide additional information about the error or other system condition in monitored system 110.

The context data determined for a condition detected in monitored system 110 may include an error level associated with the condition detected in system 110. In one embodiment, the following error levels may be defined and associated with the condition detected in system 110:

Level 0—This error level is associated with system conditions related to error handling code and DDE module 112a;
Level 1—This error level is associated with all internal errors and OS exceptions detected in the monitored system;
Level 2—This error level is associated with external errors that are handled by DDE module 112a.
Level 3—This error level is associated with external errors that are not handled by DDE module 112a. The rule-based processing performed by DDE 112a may not be invoked for these errors.

The context data determined for a condition detected in monitored system 110 may include impact information associated with the condition specifying the potential impact(s) that the condition may have on the monitored system. In one embodiment, the impact information associated with the condition detected in monitored system 110 describes the potential consequences of the condition in terminology that is understandable by users such as system administrators who can use the information to take remedial actions to repair or mitigate the impacts.

For example, the impact information for a memory corruption error related to the dictionary heap may indicate that the dictionary is corrupted. As another example, the impact information related to a memory corruption error related to a heap that belongs to row cache may indicate that the row cache has been corrupted. Accordingly, the same condition (i.e., memory corruption) that is detected in monitored system 110 may have different associated impacts depending upon the context of the condition. The impact information thus provides specific contextual information related to the impact of a detected condition on monitored system 110, such as which particular memory was corrupted rather than some generic impact information such as "memory corruption".

In one embodiment, the impact information may be specified in an external file that maps the impact information to an error number and/or error arguments that are associated with the condition detected in system 110. In this embodiment, given an error number and/or error arguments that are associated with the system condition, DDE 112a may use the external file to map the error number and/or error arguments to the associated impact information.

The context data determined for a condition detected in monitored system 110 may include information related to information that is explicitly tagged as relevant to diagnosis. The tagged information may be a specific section of system code or a specific function or process executing in the monitored system. The information related to the tagged information may include a name for the tag, a tag identifier of the tag, a tag state (e.g., "active" or "inactive"), and other information related to the tagged information. During runtime of system 110, the tag state for a tag may be changed from "inactive" to "active" depending on whether the tagged information is active on the call stack or not. If the tagged information (e.g., a tagged function/process) is active on the call stack upon occurrence or detection of a condition in system 110, then the information related to the tagged information is provided to DDE 112a as useful contextual data for gathering diagnostic data that is relevant to the condition detected in monitored system 110.

The tagged information that is provided by active state module 112e provides useful contextual data other than just a component or a function name, which tends to be too coarse grained for diagnostic purposes. In this manner, tagging provides a window into what was occurring in the monitored system at and around the time of the error. Tagging also enables a user to specify what specific contextual data may be gathered by active state module 112e and used for diagnostic data dumping upon failure occurrence.

The context data determined for a condition detected in monitored system 110 may include information related to function and/or process that are being executed in the monitored system. The context data may also include information related to system components. The component information may include information related to system components that are on the call stack, information related to the system component that signaled the system condition, information related to the system component that has been identified as most likely having caused the condition in system 110, and the like.

In one embodiment, the component information may be determined by a component module 202. For example, component module 202 may determine one or more different functions on the call stack upon occurrence or detection of a condition in the monitored system. Component module 202 may then map the function to the various component information that is associated with the function on the call stack. In one embodiment, in order to prevent issues arising from function name mangling among different monitored system platforms, component module 202 may be configured to first normalize the various different function names on the call stack and then use the normalized names for mapping purposes.

The context data determined for a condition detected in monitored system 110 may further include information associated with an incident that is generated for an error detected in system 110. In one embodiment, an incident represents a single occurrence of an error in monitored system 110. In one embodiment, an incident may be generated only for a critical error detected in monitored system 110. In one embodiment, DDE 112a comprises an incident module 204 that is configured to create an incident for an error detected in monitored system 110. In one embodiment, incident module 204 is configured to create incidents only for critical errors in monitored system 110.

Various different information may be associated with and stored for an incident that is created by incident module 204. A problem key may be generated for and associated with the incident. The problem key for the incident may comprise an error number, one or more error arguments, and other information that is associated with the error that caused the creation of the incident. In one embodiment, a problem key is used to map the incident to a problem.

In one embodiment, a problem is a set of incidents that are perceived to have the same symptom and problem key. Incidents that have the same associated problem key may be mapped to a single problem representing a specific symptom. Such a mapping may effectively reduce the amount of diagnostic data that is collected for multiple incidents having the same symptom. For example, instead of collecting and storing diagnostic data for each incident that maps to a particular problem, only limited sets of diagnostic data may be collected and stored for a particular symptom for the problem that corresponds to multiple incidents.

As mentioned previously, DDE 112a provides a rule-based engine for determining one or more diagnostic actions to be performed for a condition detected in monitored system 110. In one embodiment, DDE 112a includes a DDE rules engine 212 for determining one or more diagnostic actions to be performed based upon the context data determined for the condition detected in monitored system 110. A set of DDE rules may be specified for DDE rules engine 212 with each DDE rule identifying a DDE condition and one or more diagnostic actions or DDE actions to be performed when the DDE condition specified in the DDE rule is met. In one embodiment, the set of DDE rules specified for DDE 112a is stored in a rule repository 216 that is accessible to DDE 112a. The set of DDE rules may be configured dynamically to suit the needs of different monitored systems. For example, the DDE rules may be configurable via a user interface 218.

In one embodiment, a DDE condition may comprise one or more expressions connected by one or more logic operators. An expression in a DDE condition may be associated with one or more arguments. For example, the following expressions and operators may be defined for a DDE condition:

1. Expressions related to an error, such as Error_Number (<error_number>), Error_Arg1(<1$^{st}$ argument>), Is_Internal_Error(<error_number>), Is_External_Error(<error_number>).
2. Expressions related to system components or function names, such as Active_Component(<component>), Signaling_Component(<component>), Function_Name (<function name>).
3. Expressions related to impacts that an error or other condition detected in a system may have on the monitored system, such as Impact(<impact_name>). For example, a DDE condition may be defined as Impact (Disk-Corruption).
4. Expressions related to a diagnostic tag that tags a specific operation as relevant for diagnostic purposes, such as Active_Tag(<tag_name>). For example, Active_Tag (transaction_rollback).
5. Logical operators may be used to connect multiple expressions. The logical operators may include "and", "or", "not", parentheses, and the like. For example, the following expression may be connected by the logic operator "AND":

Error_Number(<error_number>) AND Impact(Disk-Corruption)

In one embodiment, DDE rules engine 212 is configured to evaluate the set of DDE rules based upon the context data determined for a condition detected in system 110. In one embodiment, DDE rules engine 212 compares the context data determined for the condition detected in system 110 to the DDE condition specified in a DDE rule to determine if the DDE condition is satisfied. For example, for a DDE condition Error_Number (<600>), if the context data determined for a condition detected in monitored system 110 includes an associated error number 600, then the DDE condition Error_Number (<600>) is evaluated to be true and thus satisfied.

If the DDE condition specified in a DDE rule is satisfied based on the context data determined for a condition detected in system 110, then one or more diagnostic actions that are specified in that DDE rule are determined to be performed. For example, a DDE rule "Error_Number (<600>) AND ActiveComponent (Heap Manager)→HEAPDUMP level=1 and heaptype=UGAHEAP" determines a heap dump action related to the UGA heap to be performed if the associated DDE condition "Error_Number (<600>) AND ActiveComponent (Heap Manager)" is evaluated to be true based upon the context data determined for a condition detected in monitored system 110.

The diagnostic actions or DDE actions that are determined by DDE rules engine 212 may include performing tasks that gather diagnostic data that is relevant to a condition detected in monitored system 110, store the gathered diagnostic data in a repository, recommend the diagnostic actions to be performed subject to user inputs, and other diagnostic related actions. In this way, by evaluating DDE rules based on the context data determined for a condition detected in monitored system 110, DDE 112a automates the gathering of diagnostic data that is relevant to the specific condition detected in monitored system 110. Such a contextual dumping effectively reduces time-to-resolution of errors or other conditions detected in monitored system 110.

A diagnostic action determined by DDE rules engine 212 may be executed by DDE 112a itself or by some other components of diagnosability framework 112 or even by some components of the monitored system. For example, DDE 112a may comprise an execution module 214 that is configured to perform a DDE action determined by DDE rules engine 212. Upon determining that a DDE rule has been satisfied, DDE rules engine 212 may send a signal to execution module 214 to perform one or more DDE actions associated with the DDE rule. Execution module 214 may then execute the identified actions. Alternatively, DDE rules engine 212 may send a signal to some other components of diagnosability framework 112 to perform a DDE action. For example, if the DDE action is a health check, a signal may be communicated to a health monitor module (not shown in FIG. 2) to perform the check.

There are two types of diagnostic actions that are determined by DDE rules engine 212. One type of DDE actions are automatically performed once it is determined that a DDE rule is satisfied. For example, a DDE action may be automatically executed to gather diagnostic data that is relevant to a specific condition detected in system 110 upon occurrence of the condition in monitored system 110. The other type of DDE actions are not executed automatically but instead recommended to the user who determines whether the recommended action is executed or not. Such actions are sometimes referred to as user actions since their executions are triggered by users through user interface 218 (e.g., command line interface or a web-based user interface). For example, the execution of a DDE action may take a long time and/or use significant system resources. As a result, the execution of such an action automatically at the time of an error condition may impact the working of monitored system 110. By allowing the user to control the execution of a DDE action, the possible system performance impact of automatically performing heavy data gathering at the time of the error condition is avoided. In one embodiment, a user action may be executed before a package comprising diagnostic data for a condition is to be transmitted to a vendor for diagnosis. A user action recommended by DDE 112a may be executed using context data determined for a condition that triggers the recommendation of the user action and/or using one or more parameters provided by DDE 112a. User actions are discussed below in further details.

In one embodiment, DDE 112a comprises a flood control module 210 that is configured to control the amount of diagnostic data gathered for a condition detected in monitored system 110 using a set of flood control rules configured for monitored system 110. For example, a flood control rule may be specified for flood control module 210 to collect diagnostic data only once for every third occurrence of an error condition within an hour in monitored system 110, and diagnostic data gathering is suppressed for all the other occurrences of the error condition in the monitored system in the hour. As another example, a flood control rule may be specified for flood control module 210 to execute a DDE action no more than three times in an hour. In this manner, flood control module 210 limits the number of diagnostic actions or DDE actions that are performed, which in turn limits the amount of diagnostic data that is gathered to a manageable limit. In one embodiment, flood control module 210 may be disabled for DDE 112a. If flood control module 210 is disabled, diagnostic data gathering for a condition detected in system 110 and/or DDE actions that are determined by DDE rules engine 212 would not be flood controlled by flood control module 210. Further information related to flood control module may be found in the applications incorporated by reference in the present application.

In one embodiment, DDE 112a comprises DDE action control module 208 that is configured to dynamically modify the DDE actions determined by DDE rules engine 212. DDE action control module 208 provides a mechanism to modify the behavior of DDE rules dynamically by turning off DDE actions determined by DDE rules engine 212 or enabling some pre-existing actions that are triggered by a condition detected in monitored system 110. Following is a list of example DDE controls that may be performed by DDE action control module 208:

Enable an action for an error, e.g., 4031→Enable StackDump.

Disable an action for an error, e.g., 4031→Disable StackDump.

Delete any previously added control for an <error, action> tuple, e.g., Clear <4031, StackDump>, which means removing whatever control that is previously added for that <error, action> tuple.

Add/disable/delete actions for a class of errors, e.g., AllExternal_Errors→Disable StackDump.

A diagnostic action determined by DDE rules engine 212 may be executed in a synchronous or asynchronous manner. In one embodiment, a DDE action is executed synchronously by the process or thread (also sometimes referred to as the crashing or failing process) that receives the condition that triggered the diagnostic action. For example, a failing process or thread may execute one or more diagnostic actions to collect diagnostic data critical for diagnosis of the condition that caused the process or thread to fail. Alternatively, a diagnostic action determined by DDE rules engine 212 may be executed asynchronously by a different process or thread such that the failing process or thread may continue processing without being affected by the executions of the diagnostic actions. In this manner, the execution of the diagnostic action does not delay the failing process or thread. Further information related to DDE actions executed in an asynchronous manner may be found in the applications incorporated by reference in the present application.

The results from executing a DDE action may be output and/or stored. For example, the results may be output to a user of diagnosability framework 112 or may be stored in diagnostic data repository 112b. The results from executing a DDE action may include information related to monitored system 110 that is determined and/or gathered for diagnostic purposes, such as relevant diagnostic data gathered for a specific condition detected in monitored system 110, information obtained from running a health check, information collected from executing a user action, and the like. In one embodiment, the results from executing a DDE action are organized and stored in diagnostic data repository 112b. Diagnostic data repository 112b provides a centralized location for storing various different types of diagnostic data, such as traces, dumps, alert logs, health monitor reports, and the like, in a structured format. The information and diagnostic data stored in diagnostic data repository 112b may be displayed through a display device or system, such as display device 222.

Figure 3:
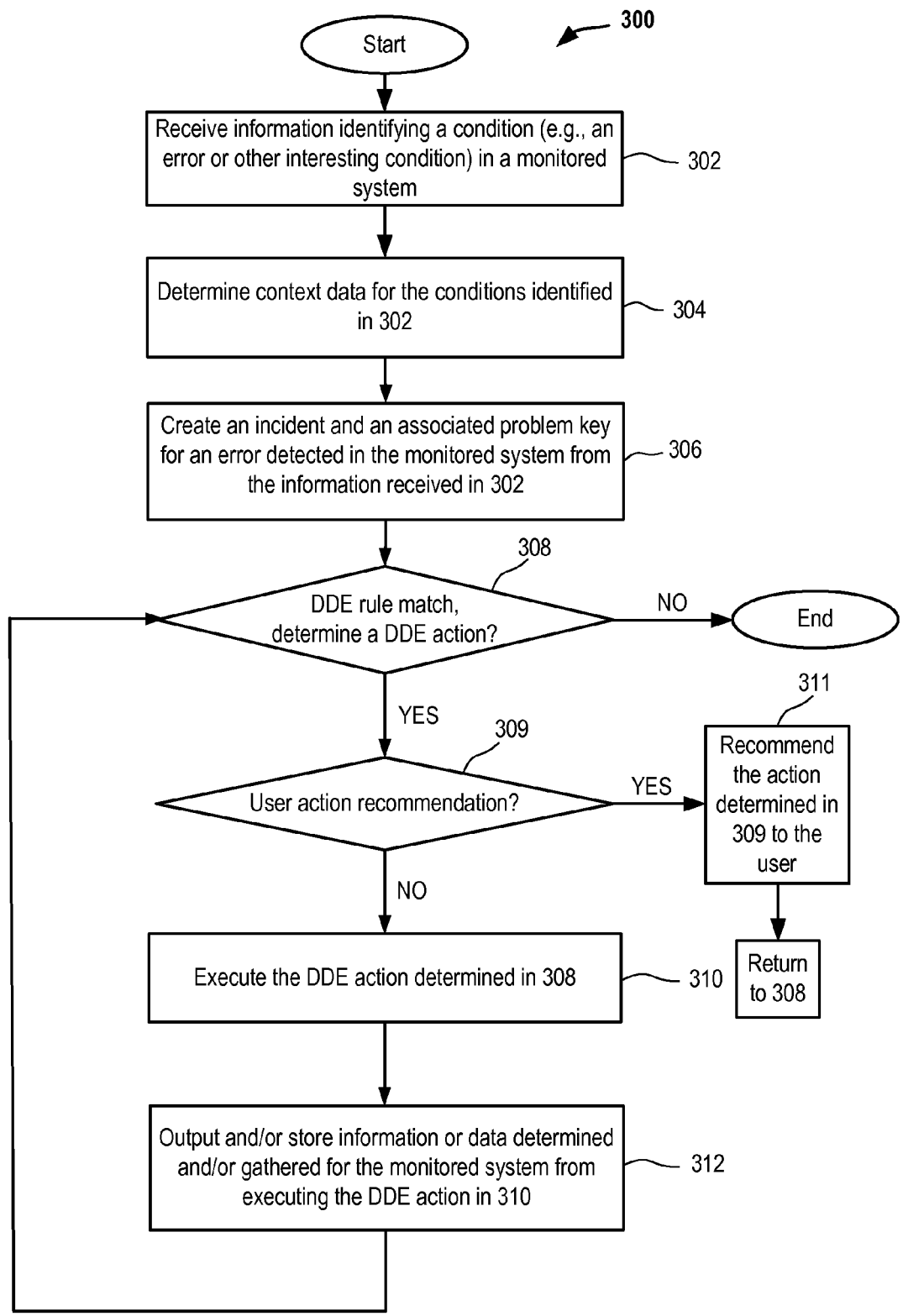
FIG. 3 is a simplified flow chart depicting a method for determining a diagnostic action according to an embodiment of the present invention.

FIG. 3 is a simplified flow chart depicting a method for determining a DDE action according to an embodiment of the present invention. The processing depicted in FIG. 3 may be performed by software (executed by a processor), hardware, or combinations thereof.

Referring to FIG. 3, at 302, information is received identifying a condition detected in monitored system 110. The information received in 302 may include information identifying the detected condition and related information. In one embodiment, the information in 302 may be received by DDE 112a.

At 304, context data is determined for the condition identified in 302. The context data that is determined for the condition may include information related to the condition such as error number and error arguments associated with the condition, information related to function and/or processes that are being executed in the monitored system, information related to components of the monitored system on the call stack when the condition identified in 302 occurred or was detected, information that is captured by active state module 112*e* such as information related to tagged function or process, information related to an incident that is created as a result of the detected condition, and the like. The context data determined in 304 may be provided to or accessed by DDE 112*a*. Further details related to determining context data are described below with respect to FIG. 4 and the accompanying description.

At 306, DDE 112*a* may create an incident and an associated problem key for the condition identified in 302.

At 308, a DDE rule is evaluated to determine one or more DDE actions to be performed if the DDE condition specified for the DDE rule is satisfied based upon the context data determined in 304. As described previously DDE 112*a* is a rule-based engine with each DDE rule identifying a DDE condition and one or more DDE actions or diagnostic actions to be performed when the condition are met based on the context data determined in 304. The DDE actions that are determined in 308 may include gathering relevant diagnostic data for the condition identified in 302 that triggered evaluation of the DDE rule and invocation of the DDE actions, recommending a user action to a user, running one or more health checks, and other diagnostic related actions.

If it is determined in 308 that a DDE action is to be performed, at 309, processing is performed to determine whether the action determined in 308 is a user action that should be recommended to a user such as a system administrator. If it is determined in 309 that the DDE action is a user action recommendation, then the action determined in 308 is recommended to a user, and processing may be returned to 308 when there are more than one DDE rules to evaluate. Otherwise, at 310, the DDE action determined in 308 is executed. The DDE action may be executed by DDE execution module 214 (e.g., gathering relevant diagnostic data) or by some other modules of diagnosability system 100 (e.g., running a health check).

At 312, the results from executing the DDE action in 310 may be output and/or stored. The results from executing a DDE action may include information related to monitored system 110 that is determined and/or gathered for diagnostic purposes, such as relevant diagnostic data gathered for the condition identified in 302 that triggered the DDE action. In one embodiment, the results from executing a DDE action may be displayed to a user via a display device (optional). The results from executing a DDE action may be stored in diagnostic data repository 112*b*. Processing may be returned to 308 when there are more than one DDE rules to evaluate.

Figure 4:
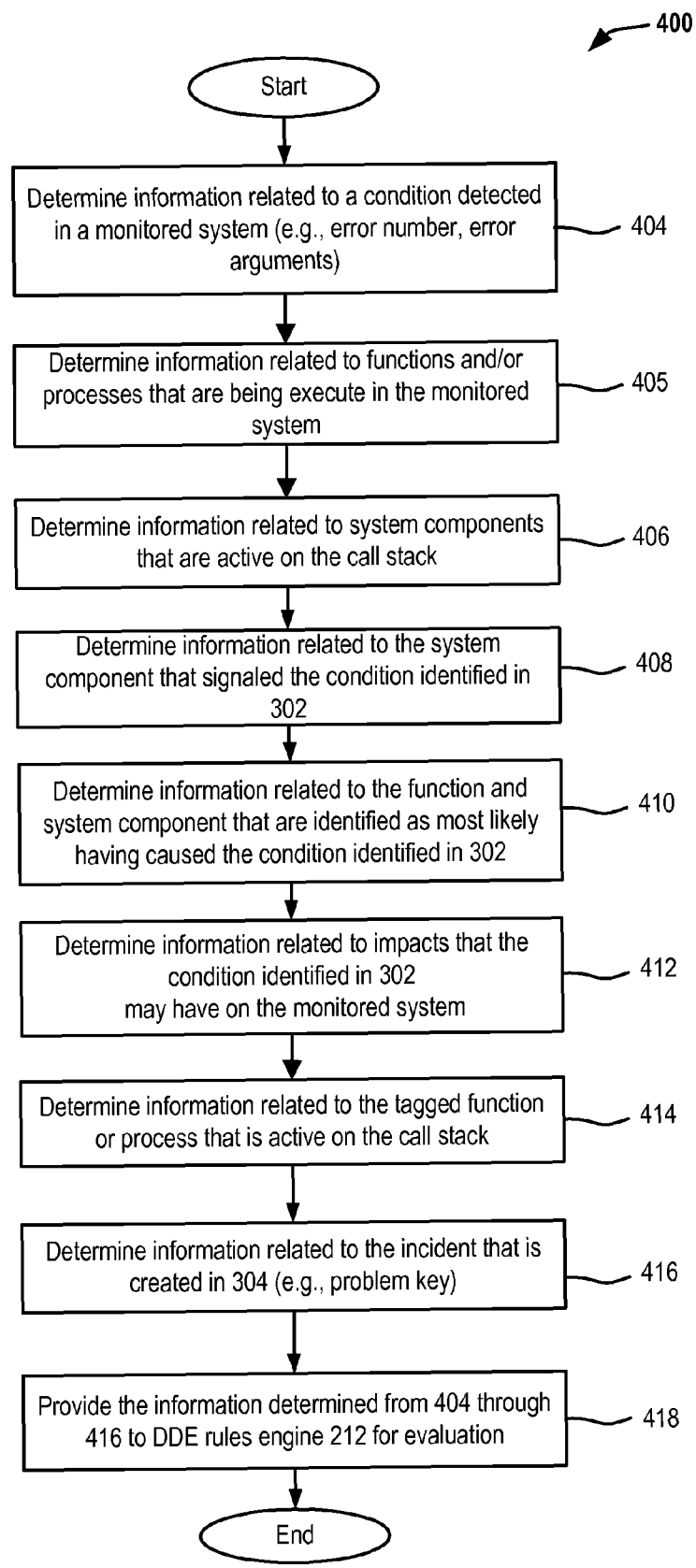
FIG. 4 is a simplified flow diagram illustrating a method for determining context data according to an embodiment of the present invention.

FIG. 4 is a simplified flow diagram illustrating a method for determining context data according to an embodiment of the present invention. The processing depicted in FIG. 4 may be performed by software (executed by a processor), hardware, or combinations thereof. In one embodiment, the processing depicted in FIG. 4 is performed in step 304 depicted in FIG. 3.

Referring to FIG. 4, at 404, information related to the condition identified in 302 is determined. In one embodiment, the information that is determined in 404 includes an error number and one or more error arguments associated with the condition identified in 302.

At 405, information related to function and/or processes that are being executed in the monitored system is determined. For example, the information may be determined from the call stack. At 406, information related to components of monitored system 110 that are active on the call stack when the condition identified in 302 was received or detected is determined. This may involve retrieving information from data structures that store the active functions information. In one embodiment, the information related to active components may be derived from the call stack by matching the function names on the call stack to the corresponding components.

At 408, information related to a component of monitored system 110 that signaled the condition identified in 302 is determined. In one embodiment, the information related to a signaling component is derived from the call stack.

At 410, information related to functions and components on the call stack that are identified as most likely having caused the condition identified in 302 is determined. In one embodiment, the information determined in 410 is derived from the call stack that stores the active functions that are being executed in monitored system 110.

At 412, information related to a probable impact that the condition identified in 302 may have on monitored system 110 is determined. In one embodiment, the information related to an impact may be determined from a table in which conditions are mapped to the corresponding associated impact information. For example, errors identified by error numbers may be each mapped to their corresponding impact information. In such an embodiment, an error number associated with the condition identified in 302 may be used to determine the corresponding impact information.

At 414, information related to tagged function or process that is active on the call stack is determined. For example, a developer may explicitly tag a specific section of a function or a specific operation in monitored system 110 as relevant for diagnostics. Upon occurrence of a condition detected in monitored system 110, if the tagged operation is active on the call stack, then information related to the tagged operation or function is gathered and provided to DDE 112*a* for facilitating the gathering of diagnostic data that is relevant to the condition identified in 302.

At 416, information related to an incident, if any, created in response to the condition identified in 302 is determined. The information related to an incident may include an incident ID, a problem key, a timestamp when the incident was generated, a set of correlation keys associated with the incident, and the like.

At 418, the information determined in 402, 404, 406, 408, 410, 412, 414, and 416 is provided to or accessed by DDE 112*a* and DDE rules engine 212 for evaluation of DDE rules.

As mentioned previously, there are two kinds of diagnostic actions or DDE actions that may be associated with a DDE rule. A first type of DDE action is performed as soon as the DDE rule is deemed to have been met or satisfied. Such an action is automatically performed without any user intervention. The other type of DDE action is not executed automatically but instead recommended to the user who determines whether the recommended action is executed or not. Such an action is sometimes referred to as user actions since its execution is triggered by users through user interface 218 (e.g., command line interface or a web-based user interface). The user may be an administrator of monitored system 110 or a user of diagnosability framework 112. Typically, a user action is an action that consumes a significant amount of time and system resources if executed at the time of the failure or error and could thus impact the working of monitored system 110. Accordingly, it is up to the user to determine if the recommended action is to be executed and, if so, when the action is to be executed. In one embodiment, a user action may be executed at some point much later than when the error condition that triggered the recommendation of the action (also sometimes referred to as a postmortem action). For example, a user action that involves building a test case based on SQL statements in a dump may consume a large amount of system resources and have potential security implications for some customers. Accordingly, such an action is only performed after receiving user confirmation and at some point much later than when the error that triggered the recommendation of the action occurred.

Figure 5:
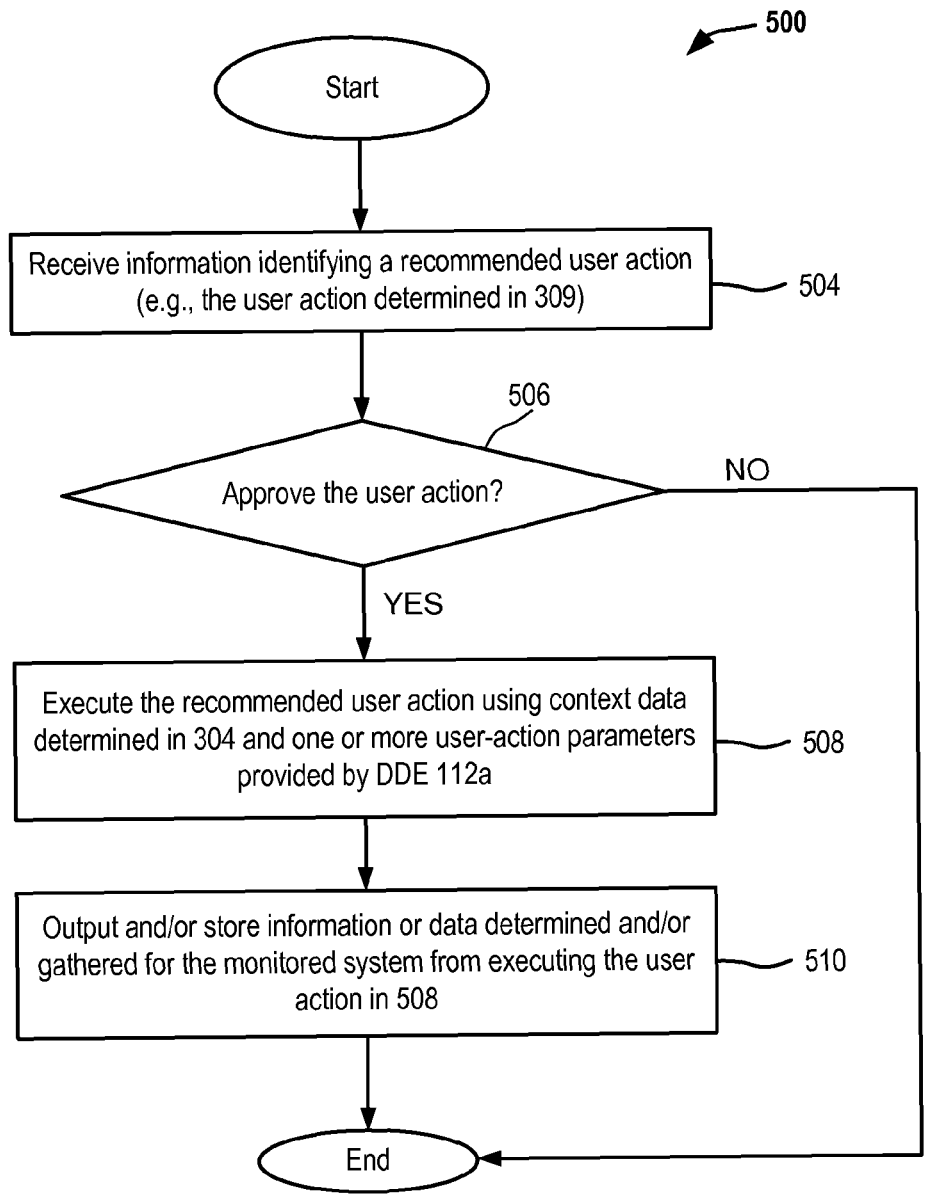
FIG. 5 is a simplified flow diagram illustrating a method for performing a recommended diagnostic action (i.e., user action) according to an embodiment of the present invention.

FIG. 5 is a simplified flow diagram illustrating a method for performing a recommended diagnostic action (i.e., user action) according to an embodiment of the present invention. The processing depicted in FIG. 5 may be performed by software (executed by a processor), hardware, or combinations thereof.

Referring to FIG. 5, at 504, information is received identifying a user action to be performed. For example, the information identifying the user action may be received from DDE 112a. The information received at 504 may include an action name, an action ID, one or more user-action parameters provided by DDE 112a, and other information related to the user action. For example, if the user action is related to SQL statements, DDE 112a may set the SQL identifier to a current value of the SQL identifier at the time of the detection of the condition identified in 302 and provide the SQL identifier value to the user when recommending the user action in 504.

At 506, processing is performed to determine if the user action is approved for execution. For example, the user may determine whether the recommended action is executed or not. By allowing the user to control the execution of a DDE action, the possible system performance impact of automatically performing heavy data gathering at the time of the error condition is avoided. If it is determined that the user action is not to be executed, then processing ends. For example, the user may deny the user action if such an action would consume a large amount of system resources that exceed a manageable limit.

Otherwise, the user action is executed at 508. For example, the user action may be executed by the user directly or is recommended and executed by the user using the web interface. In one embodiment, a user action may be executed before a package comprising diagnostic data for a condition is to be transmitted to a vendor for diagnosis. A user action recommended by DDE 112a may be executed using context data determined for a condition that triggers the recommendation of the user action and/or using one or more parameters provided by DDE 112a.

As mentioned previously, a user action may be executed at a much later time than at the time of the detection of the condition identified in 302. By using the context data determined for a condition that triggers the recommendation of the user action (e.g., context data determined in 304), even though the user action is executed much later, the user action is executed as if the action was executed at the time of the detection of the condition identified in 302. In this manner, the downside of not running the recommended user action at the time of the detection of the condition identified in 302 is reduced, if not eliminated.

At 510, the results from executing the recommended user action in 508 may be output and/or stored. For example, the results from executing the user action may be stored in diagnostic data repository 112b. The results from executing the user action may include information related to monitored system 110 that is determined and/or gathered for diagnostic purposes. In one embodiment, the results from executing the user action may be displayed to a user via a display device (optional).

Figure 6:
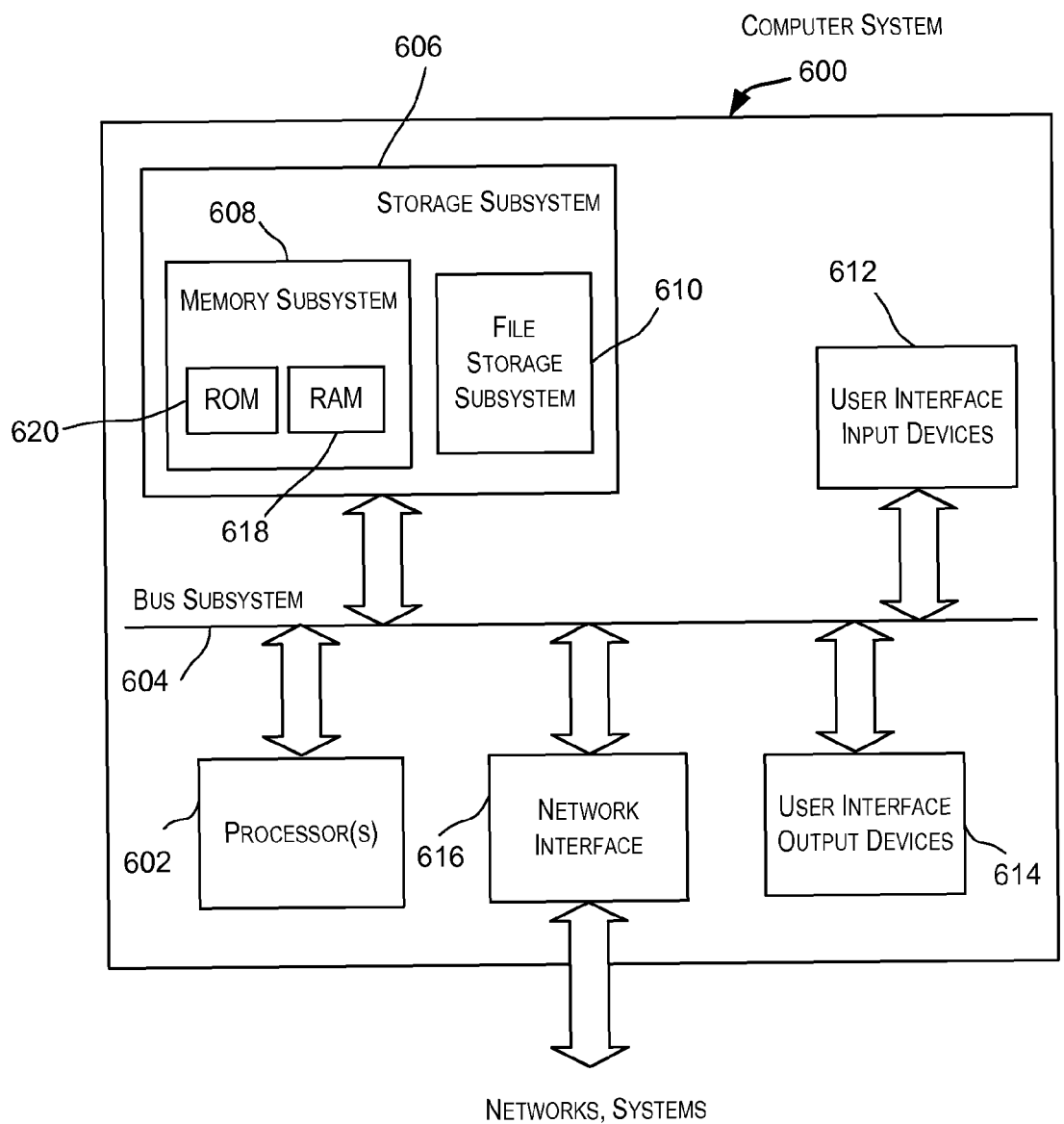
FIG. 6 is a simplified block diagram of a computer system that may be used to practice an embodiment of the various inventions described in this application.

FIG. 6 is a simplified block diagram of a computer system that may be used to practice an embodiment of the various inventions described in this application. Computer system 600 may serve as the platform for the diagnosability frameworks depicted in FIG. 1. For example, a computer system 600 at the monitored system site may serve as a platform for diagnosability framework 112. A computer system 600 located at a diagnosis site may serve as a platform for diagnosability framework 116. A diagnosability framework may also be distributed across multiple computer systems.

As shown in FIG. 6, computer system 600 includes a processor 602 that communicates with a number of peripheral subsystems via a bus subsystem 604. These peripheral subsystems may include a storage subsystem 606, comprising a memory subsystem 608 and a file storage subsystem 610, user interface input devices 612, user interface output devices 614, and a network interface subsystem 616.

Bus subsystem 604 provides a mechanism for letting the various components and subsystems of computer system 600 communicate with each other as intended. Although bus subsystem 604 is shown schematically as a single bus, alternative embodiments of the bus subsystem may utilize multiple busses.

Network interface subsystem 616 provides an interface to other computer systems, networks, and portals. Network interface subsystem 616 serves as an interface for receiving data from and transmitting data to other systems from computer system 600. For example, for the diagnosability framework deployed at the customer site or site where the software system is deployed, network interface subsystem 616 may be configured to transfer diagnostic packages from the customer site to the vendor or diagnosis site.

User interface input devices 612 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 600.

User interface output devices 614 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 600.

Storage subsystem 606 provides a computer-readable medium for storing the basic programming and data constructs that provide the functionality of the present invention. Software (code modules or instructions) that provides the functionality of the present invention may be stored in storage subsystem 606. These software modules or instructions may be executed by processor(s) 602. Storage subsystem 606 may also provide a repository for storing data used in accordance with the present invention such as the diagnostic data repository. Storage subsystem 606 may comprise memory subsystem 608 and file/disk storage subsystem 610.

Memory subsystem 608 may include a number of memories including a main random access memory (RAM) 618 for storage of instructions and data during program execution and a read only memory (ROM) 620 in which fixed instructions are stored. File storage subsystem 610 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 600 can be of various types including a personal computer, a portable computer, a workstation, a network computer, a mainframe, a kiosk, a server or any other data processing system. Due to the ever-changing nature of computers and networks, the description of computer system 600 depicted in FIG. 6 is intended only as a specific example for purposes of illustrating the preferred embodiment of the computer system. Many other configurations having more or fewer components than the system depicted in FIG. 6 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps. While the embodiments of the diagnosability framework have been described as providing diagnostic support for software product instances, in alternative embodiments, embodiments of the present invention may be used for providing diagnostic support for software products, hardware products, or products having combination of software and hardware.

Further, while the present invention has been described using a particular combination of hardware and software, it should be recognized that other combinations of hardware and software are also within the scope of the present invention. The present invention may be implemented using hardware, software, or combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the inventions.

What is claimed is:

1. A method for performing a diagnostic action in a monitored system, comprising:
    detecting a condition in the monitored system;
    determining context data for the detected condition;
    receiving a user action parameter at the time of the detection of the condition;
    determining a diagnostic action to be performed responsive to the detected condition based upon the context data determined;
    outputting information recommending execution of the diagnostic action;
    providing the user action parameter to a user;
    receiving user input indicating that the diagnostic action is approved for execution,
    determining a later point in time based upon the user input; and
    executing the diagnostic action at the later point in time using the context data determined for the detected condition and the user action parameter.

2. The method of claim 1 wherein the detected condition is an error in the system and determining the context data comprises determining context data for the error.

3. The method of claim 1 wherein the context data comprises information related to the detected condition in the monitored system, information related to functions and/or processes that are being executed in the monitored system, or combinations thereof.

4. The method of claim 1 wherein determining the diagnostic action to be performed comprises:
    determining a set of one or more rules configured for the monitored system, each rule specifying a condition and one or more actions to be performed when the condition specified in the rule is satisfied;
    determining that the condition associated with a first rule from the set of rules is satisfied by the context data determined, wherein at least one action specified by the first rule is the diagnostic action determined to be performed in the monitored system.

5. The method of claim 1 wherein the diagnostic action is an action to generate a test case to determine information related to the monitored system.

6. The method of claim 1 wherein the diagnostic action is an action to gather diagnostic data that is relevant to the detected condition.

7. The method of claim 1 wherein executing the diagnostic action comprises gathering diagnostic data that is relevant to the detected condition prior to communicating the relevant diagnostic data to a diagnosis system.

8. The method of claim 1 wherein executing the diagnostic action comprises executing the diagnostic action at a later point of time after occurrence of the condition in the monitored system.

9. The method of claim 1, wherein the information recommending execution of the diagnostic action identifies the diagnostic action and includes one or more user action parameters, and outputting information recommending execution comprises providing a current value to the user.

10. The method of claim 9, wherein the current value is determined at the time the condition is detected.

11. A computer-readable storage medium storing a plurality of instructions for controlling a processor to determine a diagnostic action in a monitored system, the plurality of instructions comprising:
    instructions that cause the processor to detect a condition in the monitored system;
    instructions that cause the processor to determine context data for the detected condition;
    instructions that cause the processor to receive a user action parameter at the time of the detection of the condition;
    instructions that cause the processor to determine a diagnostic action to be performed responsive to the detected condition based upon the context data determined;
    instructions that cause the processor to output information recommending execution of the diagnostic action;
    instructions that cause the processor to provide the user action parameter to a user;
    instructions that cause the processor to receive user input indicating that the diagnostic action is approved for execution;
    instructions that cause the processor to determine a later point in time based upon the user input; and
    instructions that cause the processor to execute the diagnostic action at the later point in time using the context data determined for the detected condition and the user action parameter.

12. The computer readable storage medium of claim 11 wherein the instructions that cause the processor to detect the condition in the monitored system comprise instructions that cause the processor to detect an error in the monitored system.

13. The computer readable storage medium of claim 11 wherein the instructions that cause the processor to determine the context data for the detected condition comprise:
    instructions that cause the processor to determine information related to the detected condition in the monitored system; and instructions that cause the processor to determine information related to functions and/or processes that are being executed in the monitored system.

14. The computer readable storage medium of claim 11 wherein the instructions that cause the processor to determine the diagnostic action to be performed comprise:
   instructions that cause the processor to determine a set of one or more rules configured for the monitored system, each rule specifying a condition and one or more actions to be performed when the condition specified in the rule is satisfied; and
   instructions that cause the processor to determine that the condition associated with a first rule from the set of rules is satisfied by the context data determined, wherein at least one action specified by the first rule is the diagnostic action determined to be performed in the monitored system.

15. The computer readable storage medium of claim 11 wherein the diagnostic action is an action to generate a test case to determine information related to the monitored system.

16. The computer readable storage medium of claim 11 wherein the diagnostic action is an action to gather diagnostic data that is relevant to the detected condition.

17. The computer readable storage medium of claim 11 wherein the instructions that cause the processor to execute the diagnostic action comprise instructions that cause the processor to gather diagnostic data that is relevant to the detected condition prior to communicating the relevant diagnostic data to a diagnosis system.

18. The computer readable storage medium of claim 11 wherein the instructions that cause the processor to execute the diagnostic action comprise instructions that cause the processor to execute the diagnostic action at a later point of time after occurrence of the condition in the monitored system.

19. A system for determining a diagnostic action in a monitored system, the system comprising:
   a memory; and
   a processor coupled to the memory;
   wherein the processor is configured to:
      detect a condition in the monitored system;
      determine context data for the detected condition;
      receive a user action parameter at the time of the detection of the condition;
      determine a diagnostic action to be performed responsive to the detected condition based upon the context data determined;
      output information recommending execution of the diagnostic action;
      provide the user action parameter to a user;
      receive user input indicating that the diagnostic action is approved for execution;
      determine a later point in time based upon the user input; and
      execute the diagnostic action at the later point in time using the context data determined for the detected condition and the user action parameter.

20. The system of claim 19 wherein the context data determined for the detected condition comprises information related to the detected condition in the monitored system, information related to functions and/or processes that are being executed in the monitored system, or combinations thereof.

21. The system of claim 19 wherein the processor is configured to determine the diagnostic action to be performed comprises:
   determining a set of one or more rules configured for the monitored system, each rule specifying a condition and one or more actions to be performed when the condition specified in the rule is satisfied; and
   determining that the condition associated with a first rule from the set of rules is satisfied by the context data determined, wherein at least one action specified by the first rule is the diagnostic action determined to be performed in the monitored system.

22. The system of claim 19 wherein the diagnostic action is executed at a later point of time after occurrence of the condition in the monitored system.

* * * * *

UNITED STATES PATENT AND TRADEMARK OFFICE
CERTIFICATE OF CORRECTION

PATENT NO.         : 8,429,467 B2
APPLICATION NO.    : 12/251743
DATED              : April 23, 2013
INVENTOR(S)        : Fallen et al.

It is certified that error appears in the above-identified patent and that said Letters Patent is hereby corrected as shown below:

On Title page 3, in column 2, under "Other Publications", line 39, delete "Office" and insert -- Final Office --, therefor.

On Title page 3, in column 2, under "Other Publications", line 39, delete "Aug. 31, 2012." and insert -- Dec. 18, 2012. --, therefor.

On Title page 3, in column 2, under "Other Publications", line 40, delete "Office Action" and insert -- Notice of Allowance --, therefor.

On Title page 3, in column 2, under "Other Publications", line 40, delete "Aug. 29, 2012." and insert -- Dec. 12, 2012. --, therefor.

In the Specification:

In column 1, line 39-40, after "SITE" delete "SCRUBBING AND EDITING OF DIAGNOSTIC DATA", therefor.

In column 5, line 17, delete "12a," and insert -- 112a, --, therefor.

In the Claims:

In column 19, line 52, in Claim 1, delete "execution," and insert -- execution; --, therefor.

Signed and Sealed this
Sixth Day of August, 2013

Teresa Stanek Rea
*Acting Director of the United States Patent and Trademark Office*